Figure 1:
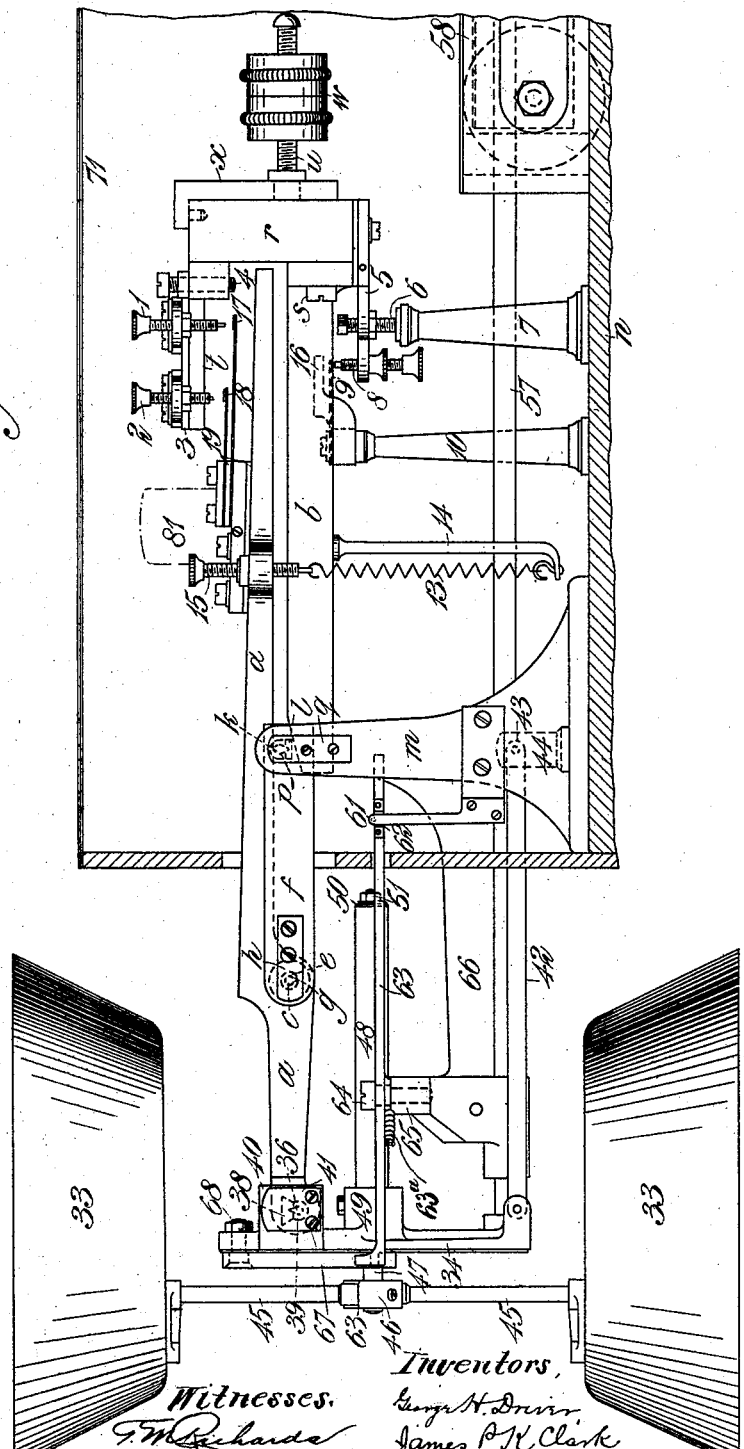

No. 748,055. PATENTED DEC. 29, 1903.
G. H. DRIVER & J. P. K. CLARK.
APPARATUS FOR WEIGHING TEA, &c.
APPLICATION FILED JULY 25, 1900.
NO MODEL. 10 SHEETS—SHEET 7.

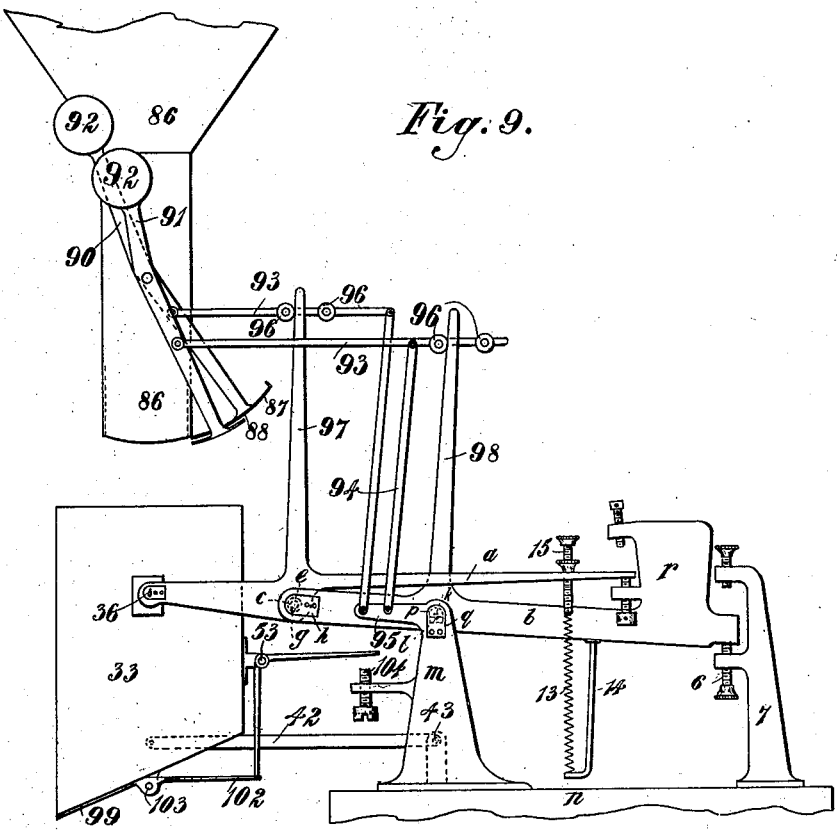

No. 748,055. PATENTED DEC. 29, 1903.
G. H. DRIVER & J. P. K. CLARK.
APPARATUS FOR WEIGHING TEA, &c.
APPLICATION FILED JULY 25, 1900.
NO MODEL. 10 SHEETS—SHEET 10.
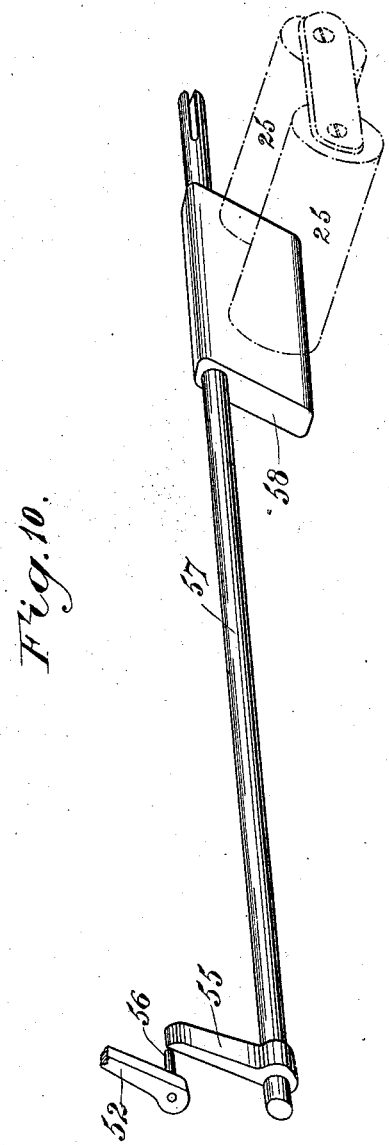

No. 748,055. Patented December 29, 1903.

UNITED STATES PATENT OFFICE.

GEORGE HALLAM DRIVER, OF WILLESDEN JUNCTION, AND JAMES PROCTOR KYD CLARK, OF SUDBURY, ENGLAND.

APPARATUS FOR WEIGHING TEA, &c.

SPECIFICATION forming part of Letters Patent No. 748,055, dated December 29, 1903.

Application filed July 25, 1900. Serial No. 24,801. (No model.)

*To all whom it may concern:*

Be it known that we, GEORGE HALLAM DRIVER, residing at Hythe Road, Willesden Junction, and JAMES PROCTOR KYD CLARK, residing at Corbiere, Elm Road, Sudbury, in the county of Middlesex, England, subjects of the Queen of Great Britain and Ireland, have invented Improvements in Machines or Apparatus for Weighing Tea and other Substances, of which the following is a specification.

This invention of improvements in machines for weighing tea and other materials (hereinafter, excepting as to one example of machine, included in the term "tea") has for object to simplify the construction and improve the working and efficiency of such machines; and it has reference, *inter alia*, for this purpose to an improved construction of compound weighing-beam adapted to control feeding mechanism in such a way as to reduce or gradually reduce the supply of tea to a scale-pan or its equivalent receptacle (hereinafter called the "scale-pan") as the quantity thereof approaches the correct amount to be weighed at each operation of the machine, and, finally, to cut off the supply of tea when a predetermined amount thereof has entered the scale-pan, and also to control means for then releasing the scale-pan and allowing the same to revolve or partly revolve or otherwise act to discharge its contents into a suitable receptacle and bring the same or another scale-pan into position for another weighing operation. A compound weighing-beam for this purpose according to this invention comprises two horizontal or approximately horizontal levers, one of which (hereinafter called for distinction the "first" lever) is fulcrumed to the front arm of the other lever, (hereinafter called for distinction the "second" lever,) which is fulcrumed near its forward end in bearings carried by standards fixed to a suitable base-piece, the rear arms of the two levers extending one over the other or arranged adjacent to one another. The front arm of the first lever has fulcrumed thereto a support that is caused to move in a practically vertical direction when the said arm tilts and carries the scale pan or pans (hereinafter referred to as "scale-pans") and means for holding the same in position. The rear arm of the said lever is connected to the rear arm of the second lever by an adjustable spring, by suitably regulating which the first lever can be caused to commence to tilt when any desired proportion of the whole amount of tea to be weighed at each weighing operation has entered the scale-pan and through suitable means control the tea-feeding mechanism in such a way as to reduce the supply thereof to the scale-pan that is for the time being in use. The rear arm of the second lever is provided with a weight to counterbalance the weight of the first lever and parts connected thereto and with an additional weight the amount of which is dependent upon the quantity of tea to be weighed at each operation, the said rear arm being adapted to control the tea-feeding mechanism in such a way as to finally cut off the supply of tea to the scale-pan when the correct amount has entered the same and caused the said arm to tilt upward. The two weights above referred to may be replaced by a single weight equivalent to them. The scale-pans are so mounted that they tend to partly rotate about their carrier and in conjunction with the means for holding them in place, so that each of them in turn shall be held in a position to receive tea from a hopper or other receptacle above. There is provided releasing mechanism that is preferably carried by the base of the machine, so as to be independent of the compound weighing-beam and is controlled by the rear arm of the second lever in such a way that upon the rising of this arm it will cause the scale-pans to be released and allow them to partly rotate, so as to cause the uppermost one to turn and discharge its contents and bring the next one into position for use.

A compound weighing-beam of the kind referred to can be constructed in various forms and be adapted to control the tea-feeding mechanism and scale-pan-releasing mechanism in various ways. Conveniently the feeding mechanism and releasing mechanism may be operated by electric devices the circuits of which are controlled by contactmaking devices, the movable parts of which are carried by the rear arms of the first and second levers.

Figure 2:
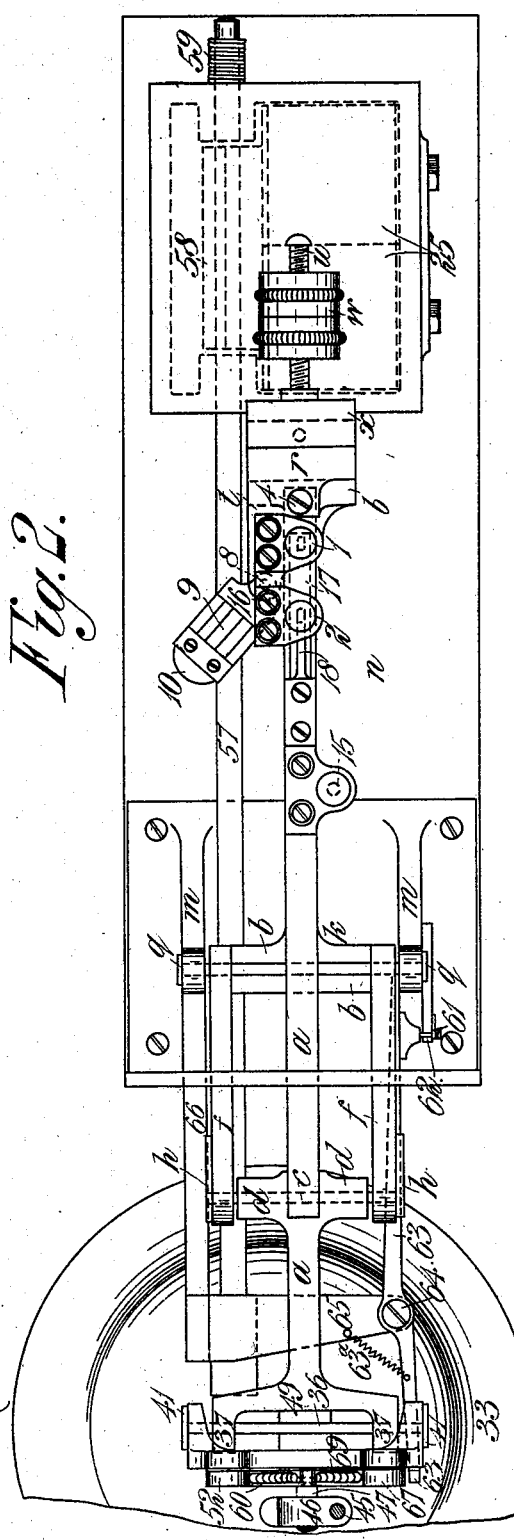
Figure 3:
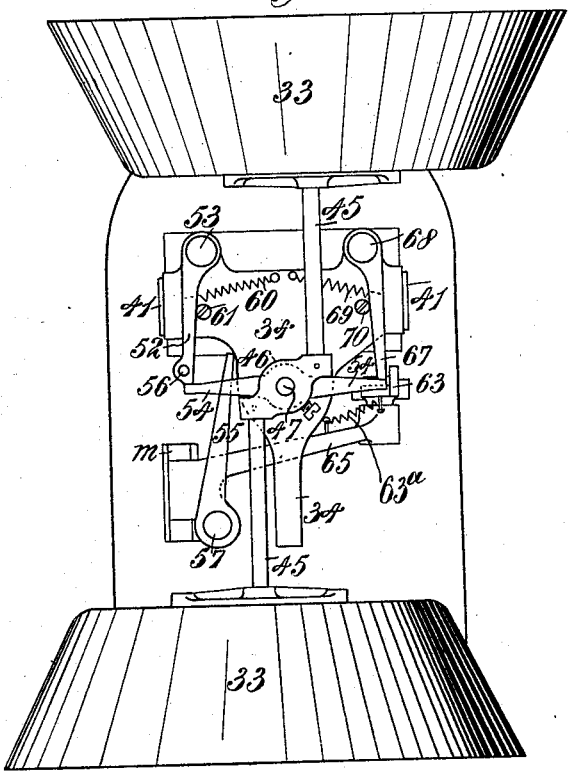
Figure 4:
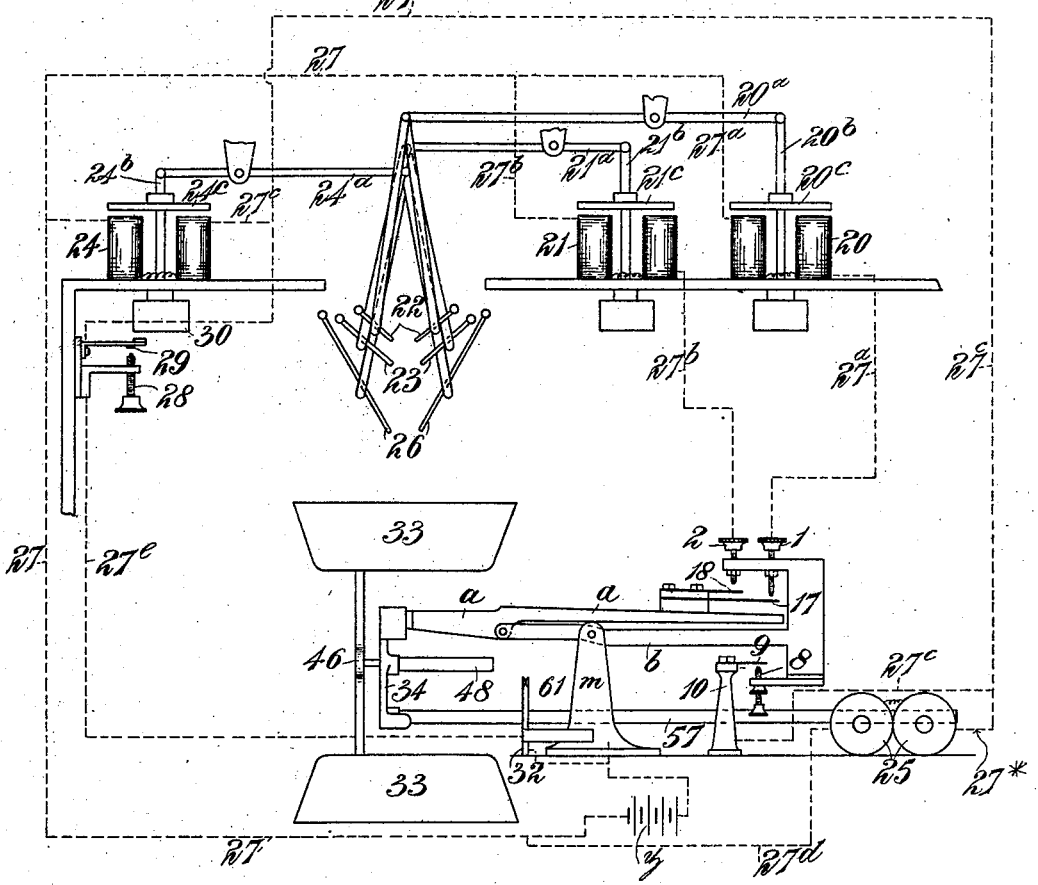
Figure 5:
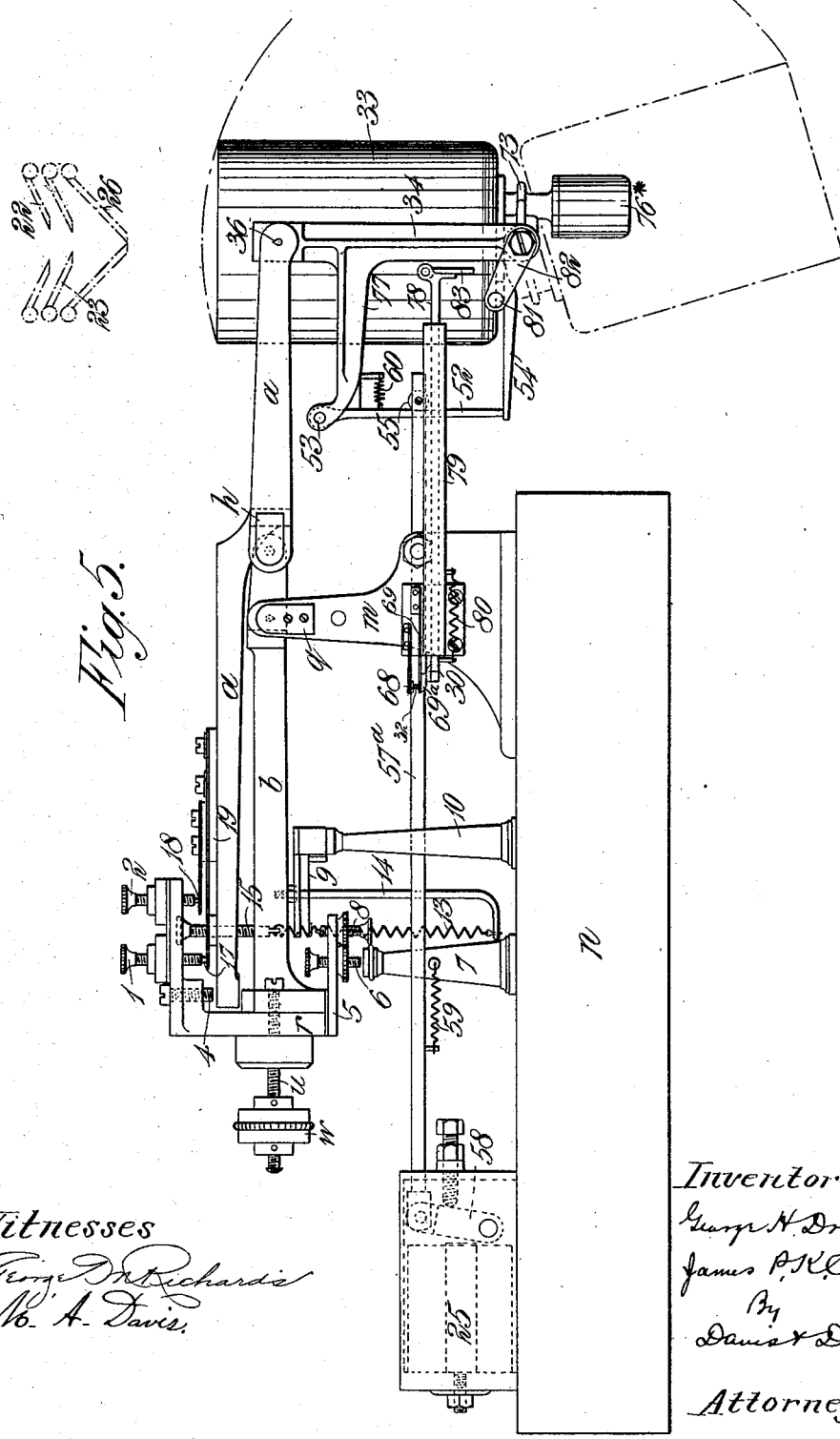
Figure 6:
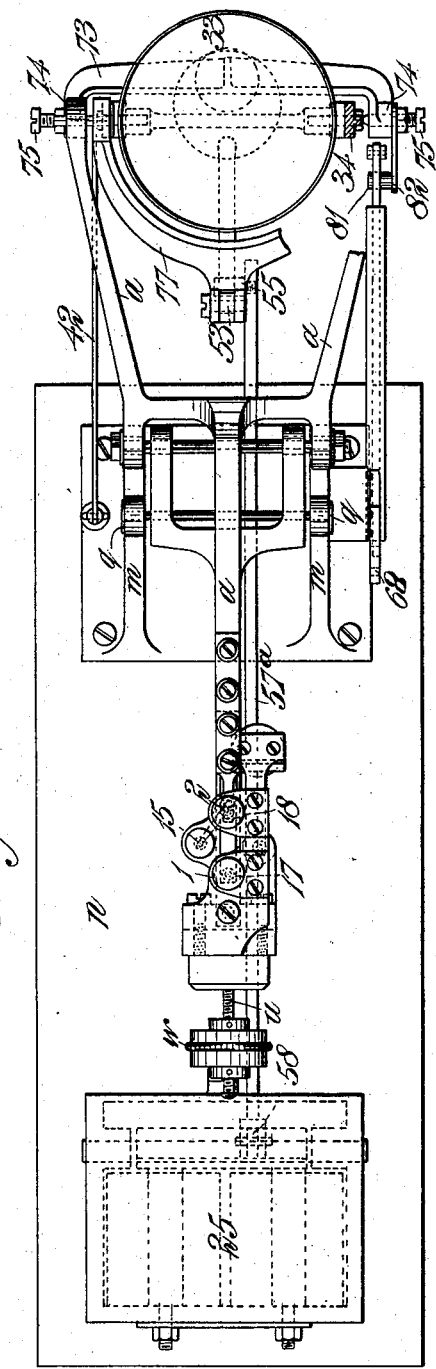
Figure 7:
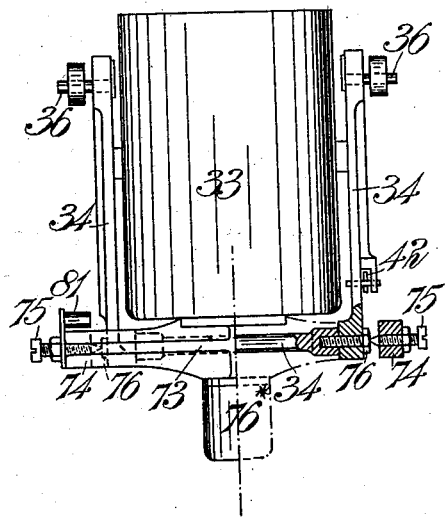
Figure 8:
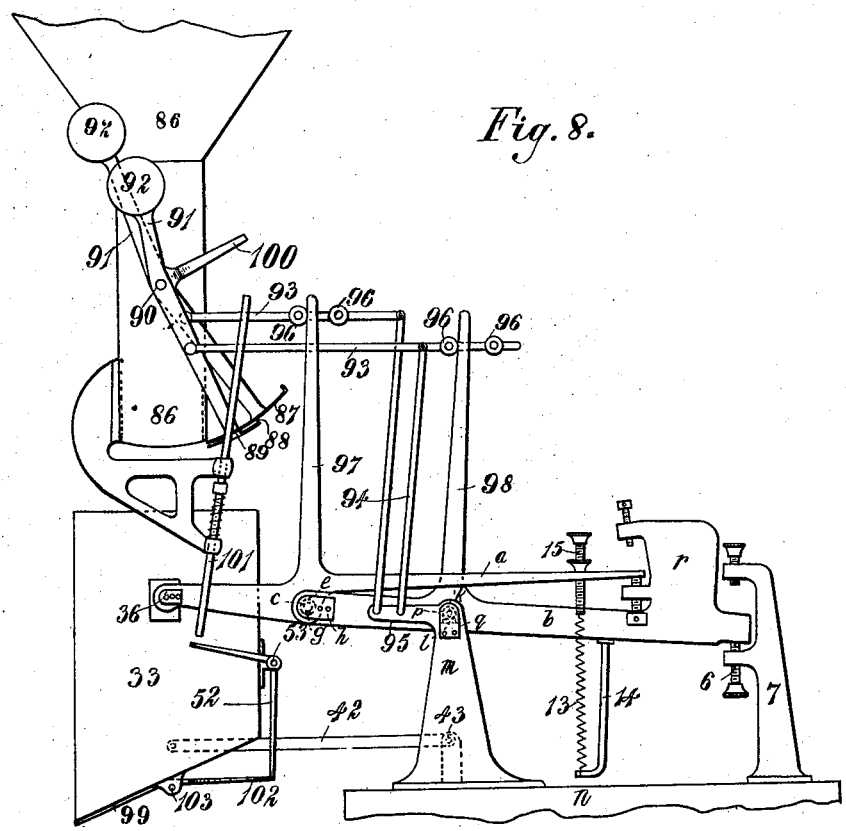

In the accompanying illustrative drawings, Figures 1, 2, and 3 show, respectively, in side elevation, plan, and front view one construction of machine according to this invention suitable for weighing tea. Fig. 4 shows in diagrammatic form the machine illustrated in Figs. 1 to 3 with feed-regulating shutters and operating means, the electrical circuits being indicated by thin dotted lines. Figs. 5, 6, and 7 show, respectively, in side elevation, plan, and front view, parts being broken away in the two latter views for the sake of clearness, another form of weighing-machine according to this invention. Fig. 8 shows in side elevation a machine according to this invention suitable for weighing grain or the like. Fig. 9 is a similar view to Fig. 8, but showing a modified arrangement. Fig. 10 is a view of the electromagnet 25 with its armature and rod.

According to the construction shown in Figs. 1 to 4, inclusive, $a$ is the first lever, fulcrumed within the bifurcated forward end of the second lever $b$ by a spindle $c$, that is fixed transversely in the first lever $a$ and the lateral extensions $d$ thereof and is journaled at its ends in two bushes $e$, that are carried by the bifurcated end portions $f$ of the second lever $b$, and each of which has a slot or groove $g$ at the bottom, the two levers $a$ and $b$ being so formed, as seen in side view, Fig. 1, that the rear arm of the first lever $a$ is arranged horizontally or approximately horizontally above the rear arm of the second lever $b$. Lateral movement of the first lever $a$ in relation to the second lever $b$ is prevented by suitable end plates $h$, which are fixed to the bifurcated end portions $f$ of the second lever $b$ and cover the ends of the bushes $e$, and so prevent lateral movement of the spindle $c$, as well as protect the bearings from dust. The second lever $b$ is supported near its bifurcated front end by a pair of knife-edges, that may conveniently be formed on a spindle $k$, fixed transversely through extensions of the said lever, the said knife-edges being carried by bearings $l$, located in the upper ends of two standards $m$, fixed to a suitable base-piece $n$. The bearings $l$, which may be formed of agate or hardened-steel blocks having V-shaped grooves therein, are preferably arranged within recesses $p$, formed in the standards $m$, and closed to prevent entrance of dust or other foreign matter by end plates $q$, which are fixed to the standards $m$, and also serve to prevent lateral movement of the spindle $k$ and lever $b$ relatively to the said standards. The rear arm of the second lever $b$ is so weighted that together with the rear arm of the first lever $a$ it will at least counterbalance the forward ends of the two levers with their attached parts.

To the end of the rear arm of the second lever $b$ is fixed by screws $s$ an L-shaped bracket $r\,t$, which with its attached parts aids in counterbalancing the forward ends of the two levers. The vertical arm $r$ of this bracket is usually made of such mass that it will also serve as the weight for weighing the smallest quantity of tea which the machine is designed to weigh. To facilitate adjustment of the beam to insure accurate weighing of tea, the bracket is provided with a screw $u$, carrying one or more endwise adjustable weights $w$. For weighing larger quantities of tea the rear arm of the lever $b$ is provided with a second and removable weight $x$, the mass of which corresponds to the additional weight of tea to be weighed at each weighing operation. This second weight may be adapted, as shown, to hook onto the bracket $r\,t$ and fit over the screw $u$. The arm $t$ of the bracket $r\,t$ is arranged to extend in a forward direction over the rear arm of the lever $b$ and carries two vertically-adjustable contact-screws 1 and 2, that are insulated by a block 3 of insulating material from the bracket $t$ and from each other. The said bracket also carries a vertically-adjustable stop, consisting of a set-screw 4. To the under side of the rear arm of the second lever $b$ is fixed an insulated plate 5, that carries a vertically-adjustable set-screw 6, adapted to normally rest upon a pillar 7, fixed to the base-piece $n$ and support the weighted arm of the lever $b$ in a horizontal or approximately horizontal position. The plate 5 also carries a vertically-adjustable contact-screw 8, arranged below an insulated spring-contact 9, carried by a second pillar 10, fixed to the base-piece $n$, which is made of insulating material.

The rear arm of the first lever $a$ is normally held down against the rear arm of the second lever $b$ by a spring 13, one end of which may be connected to the lower end of a rod 14, fixed to the rear arm of the second lever, the other end of the spring being connected to a vertically-adjustable screw 15, carried by the rear arm of the first lever $a$. Upward turning movement of this lever-arm relatively to the rear arm of the second lever $b$ is limited by the adjustable stop 4 and upward turning movement of the rear arm of the second lever $b$ is limited by the lower contact-screw 8, carried thereby, causing the spring-contact 9 above it to abut against an arm or cock piece 16, fixed to the second pillar 10.

The rear arm of the first lever $a$ carries two contact-springs 17 and 18, which upon the said arm rising come successively into contact with the two insulated upper contact-screws 1 and 2 and successively complete the circuits of electromagnetic devices 20 and 21, Fig. 4, that successively close shutters 22 and 23, respectively, for cutting off the main and intermediate supply of material to be weighed to the scale-pan in use. The lower contact-screw 8 serves when brought into connection with the spring-contact 9 above it by the rising of the rear arm of the second lever $b$ to complete the circuit or circuits of two electromagnetic devices 24 25, Fig. 4, one of which—viz., 24—operates the shutters 26, that finally cut off the supply of material to the scale-pan, and the other, 25, operates the releasing mechanism to permit the scale-pan to move and discharge its contents, as hereinafter described. The slides or shutters 22, 23, and 26 and the electromagnetic devices 20, 21, and 24 for operating them may be of any known or suitable kind. In the arrangement shown in Fig. 4 the shutters of each pair are plates pivoted at one end and connected to a pair of rods $20^a$, $21^a$, or $24^a$, that are connected to one end of a lever $20^b$, $21^b$, or $24^b$, the other end of which is connected by a rod $20^d$, $21^d$, or $24^d$ to the armature $20^c$, $21^c$, or $24^c$ of the corresponding electromagnets 20, 21, or 24, so that the respective pairs of shutters will be closed electrically by the corresponding electromagnetic device, when the same is energized and opened by gravity when the circuits of the respective electromagnetic devices are opened.

The contacts 8, 17, and 18 are connected, it may be, through the compound beam $a\ b$ or through insulated wires carried thereby to one pole of an electric generator $z$. The other pole of the generator is connected to the contacts 1, 2, and 9 through a common conductor 27 and conductors $27^a$, $27^b$, and $27^c$, which respectively include the windings of the electromagnetic devices 20, 21, and 24, so that these devices will be successively excited when the movable contacts 17, 18, and 8 are successively brought into contact with the fixed contacts 1, 2, and 9, respectively. The winding of the electromagnetic device 25 is connected at one end to the contact 9 through a conductor 27 and a part of the conductor $27^c$ and at the other end by a conductor $27^d$ to that pole of the electric generator $z$ to which the contact 8 is connected, so that such device 25 will also be excited when contact 8 is brought against the contact 9.

Each of the electromagnetic devices 24 and 25 is held excited after the contact 8 has fallen away from the contact 9 (by reason of the tea leaving the pan) until such time as a scale-pan is again in position ready to receive the tea for the next succeeding weighing operation. This may be effected by arranging each of the electromagnetic devices 24 and 25 to be brought into a shunt-circuit independent of the circuits through the contacts 8 and 9, when the rear end of the lever $b$ rises and completes the circuits of such devices. For this purpose the conductor $27^c$ may be arranged to be connected to the same pole of the electric generator $z$ as the contact 8 through a conductor $27^e$ and a contact-maker comprising fixed and movable contacts 28 and 29, the latter of which is arranged to be forced into connection with the former by a movable part 30 of the electromagnetic device 24 when the latter comes into operation to finally cut off the supply of tea to the scale-pan. As will be seen, when this takes place the circuit of the device 24 will be completed through parts of the conductors 27 and $27^c$ and the conductor $27^e$, while the circuit of the device 25 will be completed through the conductor $27^d$, part of the conductor $27^c$, and the conductor $27^e$. While a fresh scale-pan is coming into position for use, both of these circuits are opened at a point 32, Fig. 4, by a circuit-breaker, as hereinafter more fully described.

From the forward end of the first lever $a$ hangs a carrier for supporting the scale-pans 33. This carrier in the example shown comprises a plate 34, suspended by knife-edges formed on a bar 36, fixed transversely through extensions 37 of the forward end of the first lever $a$. The said knife-edges work against agate blocks 38, arranged within recesses 39, that are formed in rearwardly-extending lugs 40 of the carrier-plate 34 and are closed by end plates 41, fixed by screws to the lugs and serving to prevent entry of dust to the said recesses 39, as well as to prevent lateral movement of the carrier relatively to the first lever $a$. The carrier-plate 34 is prevented from swinging by a radius rod or link 42, that is jointed to the lower end of the plate and to a pin 43, held in a lug 44 and located in the same vertical plane as the knife-edge bearings $k$ of the second lever $b$.

The scale-pans 33, of which in the example under notice there are two, are according to this construction each made in the form of a shallow pan carried by a rod 45, that is fixed to one side of a boss or collar 46, secured to a horizontal spindle 47. This spindle extends through the carrier and a bearing, preferably arranged within a tube 48, fixed to a boss 49 on the carrier-plate 34, the spindle being prevented from moving outward by a washer 50, secured thereon by a nut 51, bearing against the inner end of the tube 48. The two rods 45 are arranged with their axes in parallel planes at opposite sides of the spindle 47, (see Fig. 3,) one rod normally extending upward and the other downward, and the upper rod and scale-pan having a tendency to fall to one side when material is placed in such scale-pan. The two rods 45, with scale-pans 33, are normally held in a vertical position by a catch 52, (hereinafter called a "stop,") that is pivoted at 53 to the carrier and normally engages one or other of two arms 54, (hereinafter called for distinction "rotary arms,") fixed to the spindle 47, or it may be to the boss or collar 46 thereon. The stop 52 is adapted to be moved out of the path of the rotary arm 54, bearing against it, by a lever-arm or tappet 55, that is arranged to move in the path of a pin 56, projecting from the stop 52, and is suitably connected, as by a longitudinal rod 57, to the armature 58 of the releasing-electromagnet 25, which is fixed on the base-piece $n$ or other suitable support independent of the two levers $a\ b$ and the circuit of which is completed by the lower contact-screw 8 of the rear end of the second lever $b$, which rises when the necessary weight of tea is present in the scale-pan, as hereinbefore described with reference to Fig. 4. The arrangement is such that normally the lever-arm or tappet 55 is held by a spring 59 or equivalent device away from the stop 52, against which it acts through the medium of the pin 56 when the electromagnet 25 is excited in such a way as to release the rotary arm 54, bearing against it, and allow the upper scale-pan 33 to turn over and discharge its contents and bring the second scale-pan into position for use, whereupon by means hereinafter described the stop 52 is released and allowed to automatically move back, aided by a spring 60, into its original position to form an abutment for the second rotary arm 54 and hold the second scale-pan in position. 61 is a pin against which the stop 52 bears when in its operative position.

In order that the lever-arm or tappet 55 shall move into a position to release the stop 52 and enable the same to engage the second rotary arm 54 when the second scale-pan 33 assumes its uppermost position, as described, there is inserted in the circuit of the said releasing-electromagnet 25 and magnetic device 24 a circuit-breaking device which upon movement of the charged scale-pan is caused to open the circuit of the said electromagnet 25 and free the armature 58 thereof and at the same time free the armature $24^c$ of the electromagnetic device 24, thereby breaking the connection 28 29. In the arrangement shown for this purpose in Figs. 1, 2, and 4 the circuit-breaking device comprises two insulated spring-contacts 61, that are normally pressed together by an insulated projection 62 on the rear end of a lever 63, pivoted at 64 to a bracket 65, fixed to an extension 66 of one of the standards $m$, the front end of the said lever being arranged in the path of a second catch 67, (hereinafter called a "lever-arm,") pivoted at 68 to the carrier 34. The lever-arm 67 is arranged to be moved sidewise by each of the rotary arms 54 in turn, so as to thereby momentarily operate the contact-lever 63 against the action of a spring $63^a$ in a direction to operate the device 61 in a direction to break the circuit or circuits of the electromagnetic devices 24 and 25 and immediately afterward release the said contact-lever 63 and allow the same to assume its normal position, in which it closes the circuit-breaking device 61, and so permits the circuit or circuits of the electromagnets 24 and 25, that control the final feed and releasing mechanism, respectively, to be again closed by the rising of the rear arm of the second lever $b$ at the next weighing operation. The lever-arm 67 may, as shown, be arranged opposite to the stop 52 and be adapted to engage each revolving arm 54 in turn, and so prevent it turning backward, the action of the lever-arm 67 in an inward direction being accelerated by a spring 69, and this movement being limited by a pin 70. 71 is a removable cover or casing that is preferably made of celluloid and serves to protect the rear parts of the compound beam with the circuit-controlling devices carried thereby, as well as the electromagnetic device 25.

The construction, arrangement, and number of the weighing-receptacles 33 and the means for releasing and arresting them can be variously modified. Thus Figs. 5, 6, and 7 show a construction of weighing-machine in which a single scale-pan 33 is used. In this case the front end of the first lever $a$, which is bifurcated, supports on knife-edge bearings 36 a U-shaped scale-pan carrier 34, between the vertical arms of which a single scale-pan 33, made in the form of a cylinder, is normally supported in an approximately vertical position. The scale-pan 33 is fixed at the bottom to a cross-piece 73, which is formed with rearwardly-extending lugs 74, provided with pivot-screws 75, the points of which work in recesses in the heads of hardened-steel screws 76, fixed to the lower part of the carrier 34, the screws 76 serving not only as bearings for the pivots 75, but also as means for fixing the lower member of the U-shaped carrier to the vertical arms thereof. 76* is a counterbalanced weight carried by the cross-piece 73, its purpose being to assist the tilting of the scale-pan on its pivots 75 when each weighing operation is completed and the stop 52 is released and to swing back the scale-pan into its operative position immediately its contents are discharged. The stop 52, which normally holds the scale-pan 33 in a vertical position, is pivoted at 53 to an extension 77 of the carrier 34 and engages an arm 54, fixed to the bracket 73. The said stop is adapted to be moved out of the path of the arm 54, bearing against it, by a pin 55, fixed to a longitudinally-movable rod $57^a$, connected to the armature 58 of the releasing-electromagnet 25. In this example the contact device 61 composes two springs 68 and 69, which are normally held together at 32 by the cam-like part 30 of a rod 78, bearing against a cam $69^a$, attached to the contact-spring 69. The rod 78 is arranged to slide in a tube 79, fixed to one of the standards $m$ of the machine. The arrangement is such that when the rear end of the beam rises it completes the circuit of the electromagnetic devices 24 and 25, as before, so that the shutters 26 are closed and the stop 52 withdrawn by the rod $57^a$ from the rotary arm 54, whereupon the scale-pan swings downward and discharges its contents. Upon the scale-pan afterward swinging upward the rod 78, with cam-like part 30, is for the purpose of breaking the circuits of the said electromagnetic devices moved backward against the action of a spring 80 by a pin 81, that is fixed to an arm 82 on the cross-piece 73 and moves idly past a pivoted hanging pawl 83 on the front end of the rod 78 when the scale-pan swings downward, but acts against such pawl and forces the rod 78 backward when the empty scale-pan swings upward. As the scale-pan completes its upward motion the pin 81 slides off the hanging pawl 83 and allows the spring 80 to draw back the rod 78, with cam-like part 30, and thereby remakes the circuit of the electromagnetic devices 24 and 25 for the purposes as hereinbefore explained.

When only two pairs of slides or shutters—say 22 and 26—are to be used for controlling the supply of tea to the scale-pan, the first lever $a$ of the compound beam is provided with a single spring-contact 17, adapted to abut against a single upper contact 1, carried by the second lever $b$. When more than three pairs of shutters are to be used, the number of contacts on the first and second levers is correspondingly increased.

In some cases instead of loading the first lever $a$ wholly by a spring, such as 13, connected to the second lever $b$, it may be primarily loaded by a removable weight 85. (Shown in dotted lines in Fig. 1.) In this case the spring 13 between the two levers need only be tightened up to the small extent necessary to finally adjust the load on the second lever $b$. In some cases the said spring may be omitted.

The compound-beam instead of operating the feed-controlling shutters or equivalent devices through electric means, as hereinbefore described, may be adapted to operate them through mechanical means.

Fig. 8 shows, partly diagrammatically, one arrangement of machine for this purpose suitable for weighing seed and like material. The lower end of the feed-hopper or chute 86 is in this arrangement made of convex shape and is adapted to be partly closed by a corresponding curved main shutter 87, formed with a small opening at 88, through which the small final supply of material can pass and which is adapted to be closed by a second correspondingly-curved non-perforated shutter 89. Each of the shutters 87 and 89 is mounted to turn about the axis of a pin 90, corresponding to the center of the arc-shaped bottom of the hopper or chute 86, and is provided with an upwardly-extending arm 91, that is loaded with a weight 92 or spring adapted to turn the corresponding shutter into either its open or closed position and hold it in that position when the arm carrying it is moved to one or other side of a vertical line passing through the center of motion of the shutter. To each shutter is jointed one end of a rod 93, the other end of which is connected by a radius-link 94 to an extension 95 of one of the standards $m$ of the weighing-beam, each rod being provided with two tappets 96. Between the two tappets 96 of the rod 93, connected to the main shutter 87, extends a vertical arm 97, connected to the first lever $a$ of the compound beam near its fulcrum $c$. A similar arm 98, connected to the second lever $b$ of the beam, extends between the two tappets 96 on the rod 93, connected to the second shutter 89. The arrangement is such that the rising in succession of the rear arms of the two levers $a$ and $b$ will cause the closing in succession of the two shutters 87 and 89, which will be reopened when the levers resume their normal positions immediately after the discharge of the weighed material, the load 92 on the arm 91 of each shutter acting to facilitate the closing and opening of the shutter when the said shutter-arm has passed its mid-position in either direction. The scale-pan 33 in this example consists of a receptacle having an inclined bottom provided with a door 99. It is suspended from knife-edge bearings 36 on the bifurcated front end of the first lever $a$ and is kept in an approximately vertical position by a radius-link 42, that is jointed to the lower portion of the receptacle 33 and to a pin 43, carried by a lug 44 on the base-piece $n$. The closing of the second shutter 89 is arranged to release the door 99, so as to allow of the weighed seed or the like automatically opening the door 99 and so becoming discharged. For this purpose an arm 100 connected to the shutter 89, is arranged, on the closing of this shutter, to come into contact with the upper end of the spring-pressed rod 101, whose lower end is thereby forced upon one arm of a trigger or pawl consisting of a bell-crank lever 52, pivoted at 53 to a lug on the receptacle 33, and the other arm of which normally rests over an arm 102, fixed to the hinged door 99. The pressure of the rod 101 on the one arm of the lever 52 causes the other arm to move clear of the arm 102, whereupon the weight of material in the receptacle 33 causes the door 99 to turn on its hinge-pin 103 and allows the discharge to take place.

In lieu of the scale-pan-door-releasing mechanism just described one arm of the bell-crank lever 52 may, as shown in Fig. 9, be extended in a rearward direction, so that upon the descent of the scale-pan this rearwardly-extending arm will come in contact with an adjustable fixed stop, such as a screw 104, whereupon the vertical arm of the lever 52 will be caused to move out of contact with the arm 102 of the door 103 and allow the said door to open as before.

105 is a weight fixed to the arm 98 of the second lever, so that upon the tilting of such lever by reason of the desired weight of material having entered the scale-pan this weight will, as soon as the center of oscillation is passed, insure the beam falling over sufficiently far to cause the one arm of the lever 52 to come in contact with the stop 104.

What we claim is—

1. In an automatic weighing-machine, a fixed support, a compound weighing-beam comprising two levers one of which is directly fulcrumed to the front end of the second one which is fulcrumed to said support, the rear arm of the first lever being extended backward past the fulcrum of the second lever and the two rear arms of the said levers being so arranged as to permit first of a limited movement of the first lever relatively to the second one, and then of the two levers moving as a complete beam, a spring connecting the rear arms of the two levers and constituting a load on the first lever, a weight attached to the rear arm of the second lever and constituting a load of greater amount than that on the rear arm of the first lever, a scale-pan carried by the front end of the first lever, feeding mechanism adapted to supply material to said scale-pan, a cut-off device adapted to be operated by turning movement of the first lever to partially cut off the supply of material to said scale-pan, another cut-off device adapted to be operated by turning movement of the second lever to completely cut off the supply of material to said scale-pan, and means adapted to control the discharge of said scale-pan.

2. An automatic weighing-machine comprising a fixed bearing, a compound weighing-beam composed of two levers one of which is directly fulcrumed to and projects beyond the front arm of the second lever which is fulcrumed to said bearing, the rear arm of the first lever being extended backward past the fulcrum of the second lever so as to be adjacent to the rear arm of such second lever, the fulcrum for the first lever comprising a spindle carried by one of the levers and a bearing carried by the other lever, the spindle acting against the bearing only at opposite sides of a vertical plane passing through the axis of the spindle, a weight carried by the rear arm of the second lever, a spring connecting the rear arms of the two levers and whereby the first one is loaded to a less extent than the rear arm of the second one, means adapted to limit turning movement of the rear arm of each lever and whereby the first lever can at first move independently of said second lever and afterward both levers can move together as one beam, a scale-pan suspended from the front end of the first lever, feeding mechanism adapted to supply material to said scale-pan, a cut-off device adapted to be operated by turning movement of the first lever to partially cut off the supply of material to said scale-pan, another cut-off device adapted to be operated by turning movement of the second lever to completely cut off the supply of material to said scale-pan, and means adapted to control the discharge of said scale-pan.

3. A weighing-machine comprising a compound weighing-beam composed of two levers of which the first is provided with a spindle whereby it is fulcrumed in the bifurcated front end of the second lever which is provided with bushes that are slotted or grooved at a part located in a vertical plane passing through the axis of the spindle so that the spindle will bear against said bushes at parts thereof located at each side of said plane, a fixed bearing to which the second lever is fulcrumed at an intermediate part of its length, the rear arm of the first lever extending backward past the fulcrum of the second lever and located near to the rear arm of said second lever, a weight carried by the rear arm of the second lever, a spring connecting the rear arms of the two levers and constituting a load for the first lever of less amount than that for the second lever, a stop carried by the rear arm of the second lever to limit turning movement of the first lever, a stop for limiting turning movement of the second lever, a scale-pan carried by the forward arm of the first lever and arranged to receive material to be weighed, means for feeding material to said scale-pan, means controlled by said levers for regulating and finally cutting off the supply of material to said scale-pan, and means for discharging said scale-pan after each weighing operation.

4. A weighing-machine comprising feeding mechanism, electromagnetic devices adapted when successively operated to cut off the supply of material from said feeding mechanism in stages, an electric generator, circuit-controllers adapted to make and break the circuit of said devices, a compound weighing-beam composed of two levers the first of which is fulcrumed to the front arm of the second lever and the two rear arms of which are loaded and arranged adjacent to each other, a fixed bearing to which the second lever is fulcrumed, a scale-pan carried by the forward end of the first lever, means for holding said scale-pan in position, an electromagnetic device adapted, when operated, to release said scale-pan and permit it to fall and discharge its contents, circuit-controlling means one part of which is carried by the rear arm of the first lever and adapted on the rising of said arm to close the circuit of one of said electromagnetic devices and partly cut off the supply of material to said scale-pan, and circuit-controlling means part of which is carried by the rear arm of the second lever and is adapted on the rising of said arm to complete the circuits of the electromagnetic devices for cutting off the final supply of material to the scale-pan and for releasing said scale-pan.

5. A weighing-machine comprising feeding mechanism, electromagnetic devices adapted when successively operated to cut off the supply of material from said feeding mechanism in stages, an electric generator, circuit-controllers adapted to make and break the circuit of said devices, a compound weighing-beam composed of two levers the first of which is fulcrumed to the front arm of the second lever and the two rear arms of which are loaded and arranged adjacent to each other, a fixed bearing to which the second lever is fulcrumed, a scale-pan carried by the forward end of the first lever, means for holding said scale-pan in position, an electromagnetic device carried by a support independently of said compound beam and adapted, when operated, to release said scale-pan and permit it to fall and discharge its contents, circuit-controlling means one part of which is carried by the rear arm of the first lever and adapted on the rising of said arm to close the circuit of one of said electromagnetic devices and partly cut off the supply of material to said scale-pan, and circuit-controlling means part of which is carried by the rear arm of the second lever and is adapted on the rising of said arm to complete the circuits of the electromagnetic devices for cutting off the final supply of material to the scale-pan and for releasing said scale-pan.

6. In a weighing-machine, the combination with feeding mechanism and devices for cutting off the supply of material therefrom in stages, and a frame provided with bearings, of a compound weighing-lever comprising two levers $a$ and $b$, the first lever $a$ being provided with lateral projections and the second lever $b$ having a bifurcated front end fitted with bushes each of which has a slot or groove, the lateral projections of said first lever being journaled in said bushes and said second lever being provided near its front end with knife-edges supported by the bearings in said frame, and the rear arm of the first lever being arranged above the rear arm of said second lever, an adjustable spring connecting the two rear arms of said lever, a stop carried by the rear arm of the second lever and adapted to limit the upward movement of the rear arm of the first lever, a stop for limiting the downward movement of the rear arm of said second lever, a weight carried by the rear arm of said second lever, a scale-pan carried by the front arm of the first lever, means carried by the rear arm of the first lever and adapted on the rising of said arm to partly close the feeding device, and means carried by the said rear arm of the second lever and adapted on the rising of said arm to finally close said feeding mechanism and cause the discharge of said scale-pan, substantially as described.

7. In a weighing-machine, the combination with feeding mechanism, electromagnetic devices for successively closing the same, an electric generator, and a support for carrying the weighing mechanism, of a compound weighing-beam comprising two levers $a$ and $b$ whereof lever $a$ is fulcrumed to the forward end of lever $b$ and has its rear arm extending over the rear arm of the latter lever and is provided with upper spring-contacts, and lever $b$ is fulcrumed in said support and has its rear arm weighted and provided with two upper adjustable and insulated contacts arranged above said upper spring-contacts and with a lower adjustable contact, a lower spring-contact carried by a fixed support and arranged above the lower adjustable contact, a scale-pan carried by the forward end of said lever $a$, means for holding said scale-pan in place, an electromagnetic device for releasing said scale-pan and allowing the same to fall and discharge its contents, and electrical connections whereby the circuits of the several electromagnetic devices for closing the feeding mechanism and releasing the scale-pan will be successively closed upon the rear arms of the levers $a$ and $b$ successively rising, substantially as described.

8. In a weighing-machine, the combination with feeding mechanism, and electromagnetic devices for controlling the same, of a compound weighing-beam comprising two levers whereof the first is fulcrumed to the second and having its rear arm arranged above the rear arm of the second lever, and the second lever is fulcrumed to the frame of the machine and has its rear arm weighted and connected through a spring to the rear arm of the first lever, a scale-pan carried by the forward end of the first lever, means for holding the same in position for use, an electromagnetic device for operating said holding means and allowing said scale-pan to move and discharge its contents, circuit-controlling devices adapted to close the circuits of said electromagnetic devices in succession upon the rising of the rear arms of the said levers, and means for keeping the circuit of the electromagnetic device that effects the final closing of the feeding device and that of the electromagnetic device for releasing the scale-pan closed until a scale-pan is again in, or nearly in, position for use, substantially as described.

9. In a weighing-machine, the combination with feeding mechanism, and electromagnetic devices for controlling the same, of a compound weighing-beam comprising two levers whereof the first is fulcrumed to the second and has its rear arm arranged above the rear arm of the second lever, and the second lever is fulcrumed to the frame of the machine and has its rear arm weighted and connected through a spring to the rear arm of the first lever, a scale-pan carried by the forward end of the first lever, means for holding the same in position for use, an electromagnetic device for operating said holding means and allowing said scale-pan to move and discharge its contents, circuit-controlling devices adapted to close the circuits of said electromagnetic devices in succession upon the rising of the rear arms of the said levers, a circuit-closer and electrical connections whereby the circuits of the electromagnetic devices that respectively cut off the final supply of material to the scale-pan and release the scale-pan are completed independently of the circuit-controllers carried by the weighing-beam upon the first of the two last-mentioned devices being operated to cut off the final supply of material, and a circuit-breaker arranged to open the circuits of the two said electromagnetic devices upon a scale-pan coming into or nearly into position for use, substantially as described.

10. In a weighing-machine, the combination with feeding mechanism, of a compound weighing-beam comprising two levers $a$ and $b$ fulcrumed one to the other and supported by the frame of the machine, a carrier suspended from the front end of lever $a$, a scale-pan mounted on said carrier and having a constant tendency to turn and discharge its contents, a rotary part connected to said scale-pan so as to turn therewith, a stop mounted on said carrier and adapted to normally engage said rotary arm and hold said scale-pan in position for use, means adapted to withdraw said stop from said rotary arm and allow said scale-pan to turn and discharge its contents, electromagnetic devices the circuits of which are adapted to be closed by rising of the rear arm of said lever $b$, one of said devices serving to finally cut off the supply of material to said scale-pan and the other to actuate said means for withdrawing said stop, a circuit-closing device adapted to be operated by one of said electromagnetic devices and to complete the circuits of said devices through connections independent of said beam, a circuit-breaking device adapted to break the circuits of said electromagnetic devices when closed by said circuit-closing device, and a movable part connected with said scale-pan and arranged to operate said circuit-breaking device and open the circuits of said electromagnetic devices upon a scale-pan coming into or nearly into position for use.

11. In a weighing-machine, the combination with feeding mechanism, of a compound weighing-beam comprising two levers $a$ and $b$ fulcrumed one to the other and supported by the frame of the machine, a carrier suspended from the front end of lever $a$, scale-pans mounted on said carrier and having a constant tendency to turn, rotary parts connected with said scale-pan so as to turn therewith, a stop mounted on said carrier and adapted to normally engage each of said rotary parts in turn and hold said scale-pans so that one of them is in position for use, means adapted to withdraw said stop from the rotary part with which it is engaged and allow the scale-pans to turn so that one will discharge its contents and the other will be brought into position for use, electromagnetic devices the circuits of which are adapted to be closed by rising of the rear arm of said lever $b$, one of said devices serving to finally cut off the supply of material to said scale-pan and the other to actuate said means for withdrawing said stop, a circuit-closing device adapted to be operated by one of said electromagnetic devices and to complete the circuits of said devices through connections independent of said beam, a circuit-breaking device adapted to break the circuits of said electromagnetic devices when closed by said circuit-closing device, a lever adapted to open said circuit-breaker, and a movable part mounted on said carrier in the path of said rotary parts and adapted by the action of each of said rotary parts in turn to actuate said lever and open said circuit-breaking device substantially as described.

Signed at 77 Cornhill, in the city of London, England, this 13th day of July, 1900.

GEORGE HALLAM DRIVER.
JAMES PROCTOR KYD CLARK.

Witnesses:
 EDMUND S. SNEWIN,
 WM. O. BROWN.